(12) United States Patent
Comte

(10) Patent No.: US 7,017,474 B2
(45) Date of Patent: Mar. 28, 2006

(54) EXTRACTION MEANS FOR PRODUCING COFFEE FOR A COFFEE MACHINE

(75) Inventor: Philippe Comte, Savièse (CH)

(73) Assignee: Steiner AG, Weggis, Weggis (CH)

( * ) Notice: Subject to any disclaimer, the term of this patent is extended or adjusted under 35 U.S.C. 154(b) by 25 days.

(21) Appl. No.: 10/989,660

(22) Filed: Nov. 17, 2004

(65) Prior Publication Data

US 2005/0109223 A1    May 26, 2005

(30) Foreign Application Priority Data

Nov. 20, 2003    (EP) .................... 03405829

(51) Int. Cl.
  *A47J 31/34*    (2006.01)
(52) U.S. Cl. ................... 99/302 P; 99/289 R; 99/287; 99/297; 99/302 R
(58) Field of Classification Search ............... 99/495, 99/496, 279, 287–302 P, 304–315, 323.3, 99/331; 100/247–249, 251
See application file for complete search history.

(56) References Cited

U.S. PATENT DOCUMENTS

| | | | | |
|---|---|---|---|---|
| 3,565,641 A | * | 2/1971 | King | .................. 99/302 P |
| 3,760,712 A | * | 9/1973 | Rossi | ................... 99/289 R |
| 4,110,221 A | * | 8/1978 | Moser | .................. 210/481 |
| 4,491,063 A | * | 1/1985 | Grossi | ................... 99/289 R |
| 4,681,028 A | * | 7/1987 | Schmed et al. | ........... 99/289 R |
| 4,852,472 A | * | 8/1989 | In-Albon et al. | ......... 99/289 R |
| 4,936,199 A | * | 6/1990 | Ruggin et al. | ............ 99/289 R |
| 4,941,399 A | * | 7/1990 | Zucchetti | .................. 99/289 P |
| 5,275,089 A | | 1/1994 | Armellin | |
| 6,129,006 A | | 10/2000 | Schmed | |
| 6,634,280 B1 | | 10/2003 | Sowden et al. | |

* cited by examiner

*Primary Examiner*—Timothy F. Simone
(74) *Attorney, Agent, or Firm*—Wenderoth, Lind & Ponack, L.L.P.

(57) ABSTRACT

An extraction device for producing coffee for a coffee machine is equipped with a brewing cylinder (2) for receiving coffee powder. The brewing cylinder is reciprocably adjustable between pre-determined positions along its axial direction in co-operation with a drive mechanism (4). Two pistons (31, 32) that are coaxially adjustable relative to one another, are located in the brewing cylinder (2). The brewing cylinder (2) incorporates a cylinder section (20), and an additional part (22) is also envisaged. The additional part (22) is moveably located at an end of the brewing cylinder (2) that can be closed by the first piston (31) and equipped with a filler opening (24) for the insertion of the coffee powder. In this way the length of the extraction device can be shortened.

12 Claims, 3 Drawing Sheets

EXTRACTION MEANS FOR PRODUCING COFFEE FOR A COFFEE MACHINE

BACKGROUND OF THE INVENTION

The invention concerns an extraction means for producing coffee for a coffee machine.

An extraction means is described in EP-B-0 299 399. It incorporates an adjustable brewing cylinder for receiving coffee powder working in co-operation with a drive means that is reciprocably moveable along a longitudinal guide between pre-determined positions as well as two pistons, adjustable relative to one another and positioned coaxially in relation to the brewing cylinder. The coffee powder is inserted through a side filler opening of the brewing cylinder, whereby an end of the brewing cylinder, which is open at the front, is held closed by one of the two pistons, i.e. the substantially fixedly installed first piston. During the adjusting of the brewing cylinder in one direction, via the first piston, the first piston defines a front-side brewing chamber together with the second piston that is moved by the brewing cylinder and ensures compression of the inserted coffee powder. In this position boiling water is inserted into the brewing chamber through one piston and pumped through the compressed coffee powder, whereafter the coffee produced in this way is conveyed to an outlet of the coffee machine through the other piston. During the subsequent adjusting of the brewing cylinder in the other direction the used coffee powder is ejected through the second piston from the brewing cylinder end that has in the meantime been released by the first piston.

Another coffee extraction means according to publication U.S. Pat. No. 5,275,089 also envisages two pistons that can be adjusted in relation to the brewing cylinder and a block incorporating a filler opening for the insertion of coffee powder. On the inside of this cylinder shaped block a sleeve and one piston are located and can be moved in a longitudinal direction. In the filling position this block is positioned at the rear sleeve part and abuts against the front side of the same together with the other piston, whereas the same are separate from one another in the ejection position. In the brewing position the piston that is positioned near the additional part comes to rest inside the cylinder part. As this sleeve within the block is a necessary requirement and has to be displaceable just like the piston associated with the same, the construction of this extraction means is complicated.

SUMMARY OF THE INVENTION

The task of this invention is to further improve the already proven extraction means of the type mentioned above in a more space saving way.

With the dividing of the machine according to this invention into the brewing cylinder and an additional part, of which one forms the actual brewing cylinder section enclosing the brewing chamber that can be adjusted via the drive means, and where the additional part is located at the end of the brewing cylinder that can be closed by the first piston, whereby the same is equipped with the filler opening for the insertion of the coffee powder. The two cylinder parts are pushed together on the facing side and adjusted together during the adjusting of the brewing cylinder in one direction. The cylinder parts can be separated from one another during the adjusting of the brewing cylinder section in the other direction, so that an axial gap is created, through which the used coffee powder can fall out. The length of the brewing cylinder, as well as the lift of the second piston required for the ejecting of the used coffee powder, can be shortened, so that the overall length of the extraction means is also reduced.

In addition the ejection process is shortened, and lastly the necessary material for the manufacture of the shortened parts is reduced. Furthermore, the additional part incorporating the filler opening, which is largely uninvolved with the actual brewing process, can be manufactured from a cheaper material, such as plastic, during a more simple process than that required for the brewing cylinder consisting of stainless steel, in which no side filler opening has to be installed.

BRIEF DESCRIPTION OF THE DRAWINGS

The invention will now be described in more detail with reference to the drawings, whereby.

DETAILED DESCRIPTION OF THE INVENTION

Figure 1:
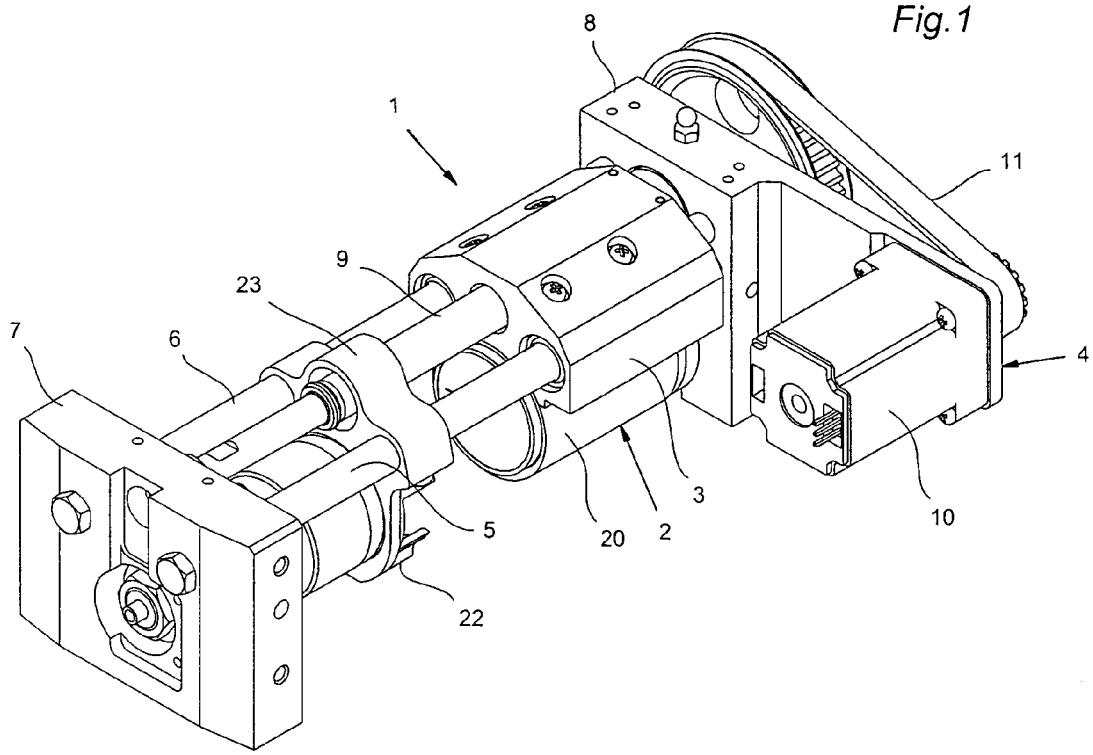
FIG. 1 shows a perspective view of an example of an embodiment of an extraction device of the present invention for a coffee machine.
Figure 2:
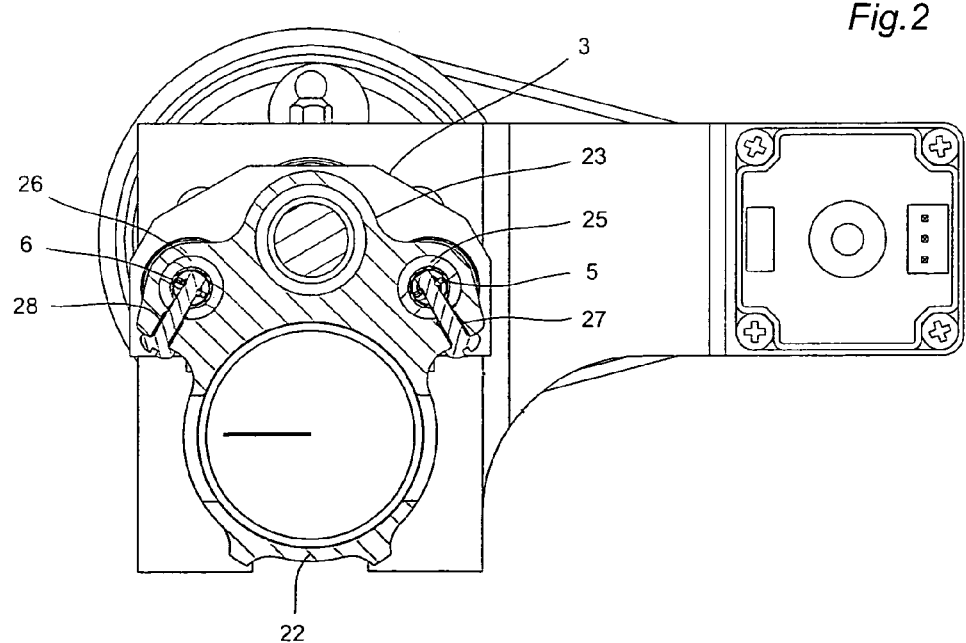
FIG. 2 is a cross-sectional view taken along line II—II in FIG. 3.

FIGS. 1 to 5 show an extraction means 1 for the producing of coffee which is used within an automatic coffee machine. It incorporates a brewing cylinder 2 with a pipe-shaped brewing cylinder section 20 and an axial cylindrical additional part 22 that can be added to the same as will be described in more detail below. One of these parts, the pipe-shaped brewing cylinder section 20, is affixed to a sledge 3 and is reciprocably positioned together with the same in co-operation with a drive means 4 along its axial direction between pre-determined positions, whereby the same is held on two guide rods 5, 6. The guide rods 5, 6 are fitted into a holder 7, 8 at each end.

The drive means 4 incorporates a drive spindle 9 which acts upon the sledge 3, which is bearingly and rotatingly positioned in the two holders 7, 8, and which stands in drive connection via a belt drive 11 with a drive motor 10, preferably a DC motor (direct current motor). The axis of the drive spindle 9 extends along a central longitudinal level of the extraction means 1 which extends between the two guide rods 5, 6.

Figure 3:
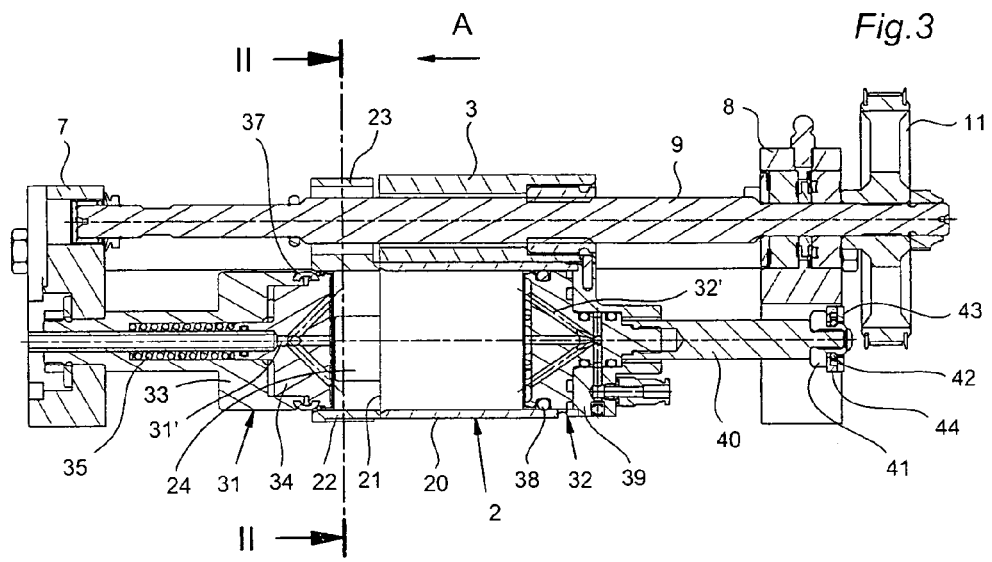
FIG. 3 is a longitudinal sectional view of the extraction device of FIG. 1 in a starting position.

In the position of the sledge 3 illustrated in FIG. 3, the additional part 22 abuts against the brewing cylinder section 20 which is fixedly connected with a front-side open end 21 of the sledge 3, whereby the same is equipped with a side filler opening 24 for the insertion of coffee powder into the hollow brewing cylinder space. The additional part 22 is connected to a guide part 23 and loosely and moveably held on the guide rods 5, 6 together with the same over the drive spindle 9 (although it is not driven by the drive spindle 9). Two springs 25, 26 (see FIG. 2) integrated into the guide rods 5, 6 act upon the guide part 23, whereby the same press the guide part 23 against a shoulder 27, 28, each radially orientated in relation to the guide rod 5, 6 and for example screwed to the same, which can also axially join the additional part 22 and the cylinder section 20 in this position.

Two pistons 31, 32, relatively adjustable in relation to one another, are coaxially associated with the brewing cylinder 2, which is adjustable in its axial direction. The first, substantially fixed piston 31 consists of two parts. Whilst one piston part 33 is fixedly installed within the holder 7, the other piston part 34 is slightly axially moveable in relation to, and spring-supported against the same. A compression spring 35 is located between the two piston parts 33, 34. The two piston parts 33, 34 are connected to one another along their circumference by an annular seal 37 having a U-shaped cross-section, which is affixed around both piston parts 33, 34 at its ends. The compression spring 35 functions to push the two piston parts 33, 34 apart and expand the seal 37 in a longitudinal direction. When the moveable piston part 34 is pressed against the fixed piston part 33, against the direction of the force of the spring 35, the seal 37 is pressed radially outwards and therefore into its sealing function position. The first piston 31 thereby closes off the front-side open end of the brewing cylinder 2.

The second piston 32 is moveably positioned within the brewing cylinder section 20. An annular seal 38 is located around the circumference of this piston 32. The second piston 32 projects from the brewing cylinder 20 through a front-side brewing cylinder end part 39 with its piston rod 40. The piston rod 40 is equipped with a head 41, preferably made of plastic, incorporating a circumferential groove 42 at its end, with which it can engage a holding means 43 located on the holder 8. The holding means 43 incorporates rod-shaped spring elements 44 co-operating with the circumferential groove 42, and extending substantially tangential to the circumferential groove 42, and which can be pressed apart during the engaging process. It is of course also possible to use a different engaging means. In the position illustrated in FIG. 3, the second piston 32 is located near the end part 39 and the piston rod 40 engages the holding means 43.

In the starting position of the extraction means 1, illustrated in FIG. 3, the ground coffee powder can be inserted into the brewing cylinder 2 through the side filler opening 24 that is connected to a coffee grinder. Within the additional part 22, two opposing side filler openings 24 that correspond with one grinder each can be advantageously envisaged.

Once a defined portion of coffee powder has been inserted into the chamber defined by the two pistons 31, 32, the brewing cylinder 2, the additional part 22 and the sledge 3 are now moved together with the brewing cylinder section 20 by the drive means 4 in the direction of the arrow A of FIG. 3, whereby the additional part 22 abutting against the cylinder section 20 is also moved together with the guide part 23, whereby the same remains pressed against the brewing cylinder section 20 by the springs 25, 26 integrated into the guide rods 5, 6. The cylinder section 20 and the additional part 22 are pushed over the first piston 31 (whilst its two piston parts 34, 33 are compressed) into a position illustrated in FIG. 4. However, the second piston 32 is also carried along by the brewing cylinder 2 moving in the direction of the arrow A whilst the head 41 is disengaged from the holding means 43 and moved a certain distance in the direction of the fixed first piston 31. In this way the chamber containing the coffee powder is compressed to a pre-determined size and the coffee powder is compressed, i.e. compacted.

Figure 4:
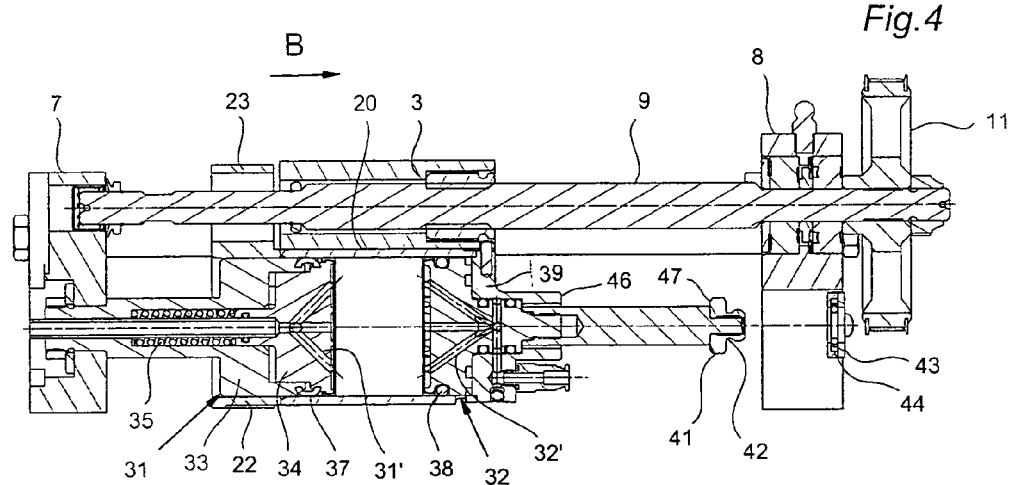
FIG. 4 is a longitudinal sectional view of the extraction device of FIG. 1 in a brewing position.
Figure 5:
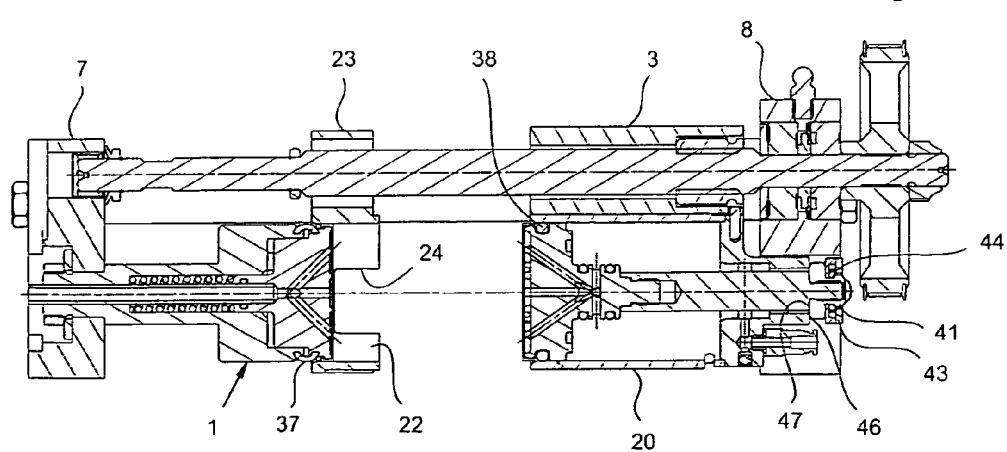
FIG. 5 is a longitudinal sectional view of the extraction device of FIG. 1 in an ejection position.

In the brewing position, illustrated in FIG. 4, the actual brewing process can be carried out in that boiling water or steam is pumped into the hollow space sealed by the seals 37, 38 and through the coffee powder through one piston (for example through the channels 32' of the second piston 32), and in that the produced coffee is conveyed to an outlet of the coffee machine that is not visible in the drawing through the other piston (for example through channels 31' of the first piston 31).

Following the completion of the brewing process, the sledge 3 is moved together with the brewing cylinder section 20 in the other direction (arrow direction B in FIG. 4) by the drive means 4. The additional part 22 connected with the guide part 23 initially remains pressed against the brewing cylinder section 20 and is moved back together with the same by the action of the spring 25, 26 until the guide part 23 abuts against the shoulders 26, 27 connected to the guide rods 5, 6. The additional part 22, equipped with the filler opening 24 (i.e. the filler openings 24) that has come to a standstill, will now be separated from the brewing cylinder section 20 that moves further together with the sledge 3 in the direction of the arrow B, and an axial gap is therefore created between these two parts. With the brewing cylinder section 20 the second piston 32 is also displaced in the direction of the arrow B until the head 41 once more engages the holding means 43. However, as the brewing cylinder section 20 is moved onwards in the direction of arrow B towards the holder 8 together with the sledge 3 until a facing surface 46 of the brewing cylinder end part 39 abuts against a counter surface 47 of the head 41 engaged in the holding means 43 (see FIG. 5) a relative movement between the second piston 32 and the brewing cylinder section 20 occurs, and the used coffee powder, i.e. the coffee grounds, is ejected from the brewing cylinder section 20 into the axial gap between the sections 20, 22 by the second piston 32 and falls into a catchment container located below the same (not illustrated in the drawing).

The division of the brewing cylinder 2 according to this invention into the cylinder section 20 located along a longitudinal guide (guide rods 5, 6) and the additional part 22, of which one forms the actual brewing cylinder section 20 enclosing the brewing chamber and adjustable by the drive means 4, and whereby the additional part 22 is equipped with the filler opening 24 for the insertion of coffee powder, whereby the same are pressed against one another with their front sides and moved in a direction A during the adjusting of the brewing cylinder section 20, and separated from one another during the adjusting of the brewing cylinder section 20 in the other direction B, so that an axial gap is created, through which the used coffee powder can be ejected, means that the length of the brewing cylinder 2 as well as the lift of the second piston 32 required for the ejecting of the used coffee powder can be shortened, so that the overall length of the extraction means 1 is also reduced.

In addition the ejection process is shortened, and lastly also some material for the manufacture of the shortened parts is saved. Furthermore the additional part 22 incorporating the filler opening 24, which is largely uninvolved with the actual brewing process, can be manufactured from a cheaper material such as plastic during a more simple process than that required for the brewing cylinder consisting of stainless steel, in which no side filler opening has to be installed.

It is of course possible to envisage different embodiments of the extraction means of this invention. It is for example possible to realize an alternative drive means to that illustrated in the drawings.

The use of a DC motor of the type of a staged motor enables a very accurate and repeatable position adjustment with a constant compression pressure, and constantly sized ground coffee portions to be ejected etc.

Figure 6:
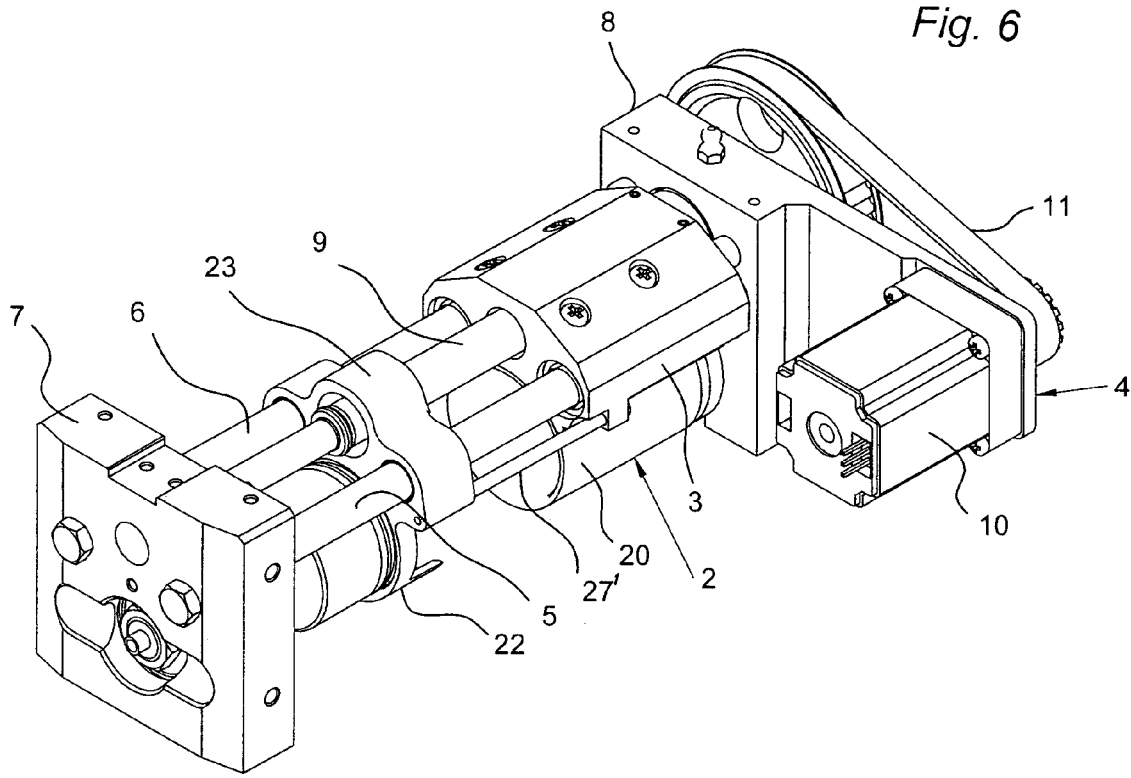
FIG. 6 is a perspective view of a further embodiment of an extraction device constructed in accordance with the present invention.
Figure 7:
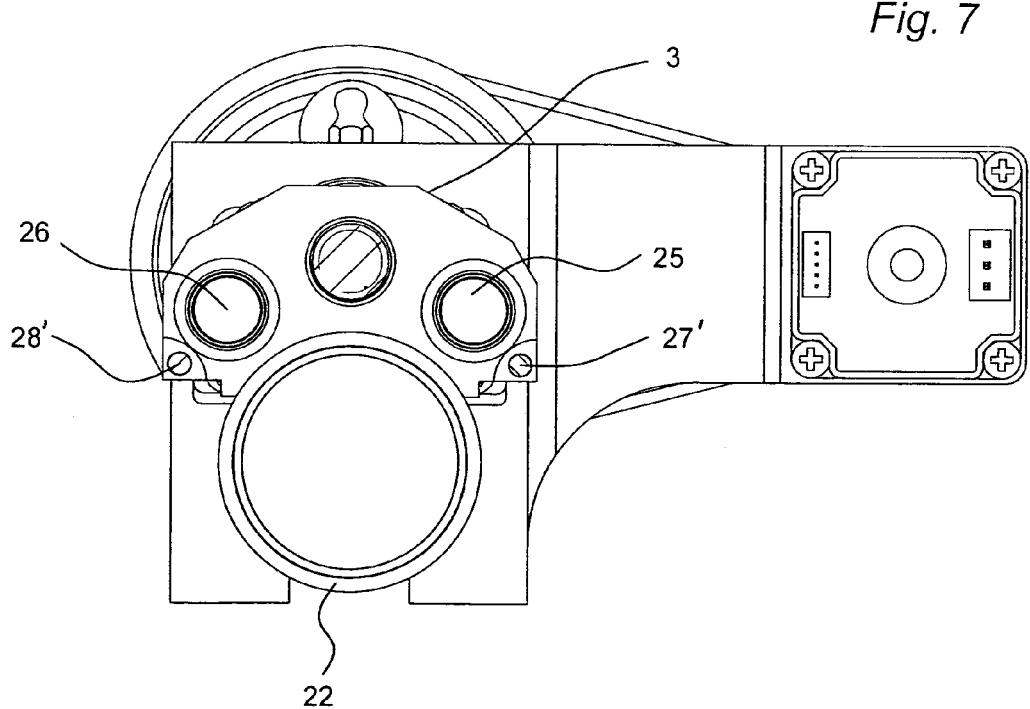
FIG. 7 is a view of the example of an embodiment according to FIG. 6, where the associated handle has been omitted.

According to FIGS. 6 and 7 the means for the front-side pressing of the cylinder section 20 against the additional part 22 for the inserting of the coffee powder with at least one spring 25, 26 can be replaced with a mere abutment of the cylinder section against the additional part.

Identically shaped parts such as those of the extraction means according to FIG. 1 to FIG. 5 have been allocated identical reference numbers and will not be described in detail below.

The cylinder-shaped additional part 22 abuts against the brewing cylinder 2 during the inserting of coffee powder on one side as shown in FIG. 3, and encloses the piston 31 on the opposite side, so that a chamber is formed. The ground coffee can then be inserted through the filler opening 24 in the additional part 22 into the chamber formed in this way from a grinder not shown in detail.

After this the cylinder section 20 is pushed further against the fixed piston 31 together with the piston 32 in an analogue fashion as also shown in FIG. 3 until the cylinder section 20 encloses this piston 31. At the same time the additional part 22 is moved in the same direction until the same comes to rest on the rear side of the piston. In this position the coffee powder is compressed into grounds and hot water is subsequently pressed through the pistons to produce the coffee.

Following completion of the brewing process, the cylinder section 20 is first retracted from the piston 31. At a certain distance the piston 32, and by association of slide rods 27', 28' positioned parallel with the guide rods 5, 6 and the relevant shoulders also the additional part 22, is also pulled as far as the filling position, i.e. to the front side of the piston 31 (see FIG. 5). As soon as the cylinder section 20 has reached the end position near the holding means 8, the coffee grounds are ejected by the piston 32.

In this way it is possible to provide a simple solution for the adjustment of the additional part 22 without creating operational disadvantages.

The invention claimed is:

1. An extraction apparatus for producing coffee for a coffee machine, the apparatus comprising:
   a drive means;
   a brewing cylinder including a cylinder section for receiving coffee powder and an additional part having at least one filler opening for inserting of the coffee powder,
   wherein the cylinder section is adjustable by operation of the drive means so that the cylinder section can be reciprocably moved between predetermined positions along its axial direction,
   wherein the additional part abuts against a front side of the cylinder section in a filling position, and the additional part and the front side of the cylinder section are separated from one another in an ejecting position, thereby forming an axial gap to permit the removal of used coffee grounds; and
   first and second pistons that are adjustable in relation to the brewing cylinder and relative to one another,
   wherein the first piston, which is adjacent to the additional part, is disposed within the cylinder section in a brewing position, and the additional part is moveably positioned relative to the first piston such that the additional part forms a brewing chamber together with the cylinder section and the first and second pistons in the filling position.

2. The extraction apparatus according to claim 1, wherein the reciprocal movement of the additional part can be effected either by the cylinder section alone or by the cylinder section together with additional means.

3. The extraction apparatus according to claim 1, wherein the cylinder section is affixed to and carried upon a sledge, which is in turn fitted on two guide rods and is adjustable via a drive spindle of the drive means, wherein the additional part is connected to a guide part which is moveably supported on the guide rods.

4. The extraction apparatus according to claim 2, further comprising means for displacing and for pressing of the cylinder section against the addition part, wherein the means for displacing and for pressing of the cylinder section against the additional part includes at least one spring, wherein the additional part is adjustable in one direction by the cylinder section, which is adjusted by the drive means against the force of the at least one spring, and the additional part is retractable in an opposite direction by the force of the at least one spring, and the movement in the opposite direction is limited by a shoulder.

5. The extraction apparatus according to claim 1, wherein the first piston includes a fixed piston part and a moveable piston part that is spring-supported against the fixed piston part, wherein the fixed and moveable piston parts are connected to one another around their circumferences by an annular seal having a U-shaped cross-section, and the annular seal can be radially pressed apart when the moveable piston part is pressed against the fixed piston part, so that the same can be brought into its sealing position.

6. The extraction apparatus according to claim 1, wherein the second piston is connected to a piston rod that projects from the cylinder section and is engagable with a fixed holding means, and is therefore reciprocably moveable relative to the axial gap in the direction of the cylinder section moving away from the additional part.

7. The extraction apparatus according to claim 6, wherein the piston rod is equipped with a head having a circumferential groove so that the head can be inserted between rod-shaped spring elements of the fixed holding means, wherein the rod-shaped spring elements are engageable with the circumferential groove and extend tangentially in relation to the circumferential groove.

8. The extraction apparatus according to claim 3, wherein the cylinder section can be retracted following completion of the brewing process, and the second piston, through association of slide rods, positioned parallel to the guide rods, and respective shoulders, can be moved to the filling position after moving a certain pre-determined distance.

9. The extraction apparatus according to claim 1, wherein the drive means comprises a staged motor.

10. The extraction apparatus according to claim 1, wherein each of the first and second pistons comprise channels, wherein boiling water or steam can be added under pressure via the channels of one of the first and second pistons into the brewing chamber, and therefore into compacted coffee powder contained therein, and the produced coffee can be conveyed through the channels of the other of the first and second pistons.

11. The extraction apparatus according to claim 1, wherein the additional part is formed of plastic.

12. The extraction apparatus according to claim 3, wherein a displacement of the cylinder section away from the first piston occurs following completion of the brewing process, and by an association of slide rods, positioned parallel to the guide rods, and respective shoulders, a displacement of the additional part is also effected up to the filling position.

* * * * *